UNITED STATES PATENT OFFICE.

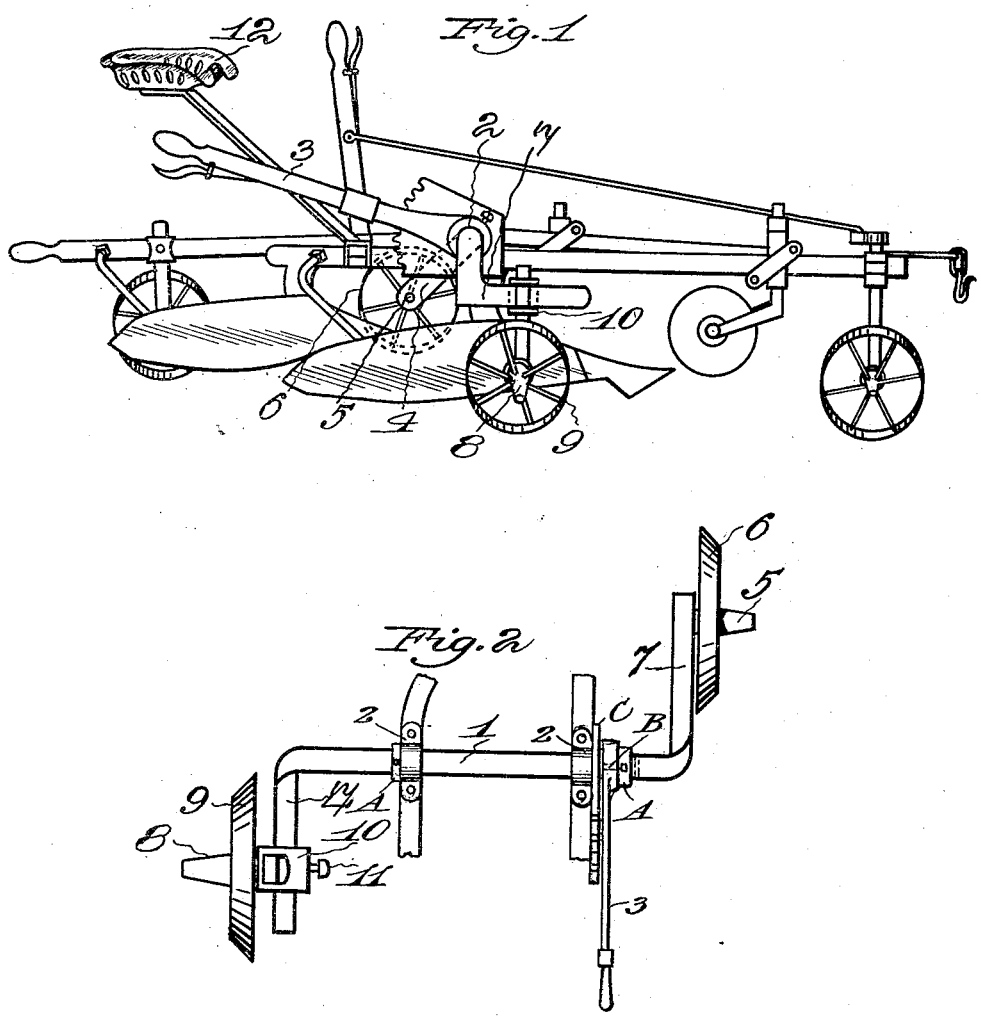

FRANCIS PATRICK DOWD, OF WAIAU TOWNSHIP, AMURI COUNTY, NEW ZEALAND.

MOLDBOARD-PLOW.

1,245,204.

Specification of Letters Patent.

Patented Nov. 6, 1917.

Application filed March 27, 1914. Serial No. 827,538.

*To all whom it may concern:*

Be it known that I, FRANCIS PATRICK DOWD, a subject of the King of Great Britain, residing at the township of Waiau, in the county of Amuri, Dominion of New Zealand, have invented new and useful Improvements in Moldboard-Plows, of which the following is a specification.

This invention relates to mold-board plows, its object being to facilitate manipulation of the implement and to provide increased stability.

In carrying this object into effect the invention comprises in the employment, upon the side of the implement remote from the land-wheel, of a fourth wheel which is so mounted that its height will be adjusted simultaneously with that of the land wheel by means of the land lever. The arrangement is such that in one position of the lever both of said wheels will be on the same level, while the action of raising the land-wheel above such level will serve to lower the fourth wheel.

In order that the nature of the invention and its construction may be fully understood reference will now be made to the accompanying sheet of drawings in which:—

Figure 1.— is a side elevation of the implement as viewed from the fourth wheel side, and, Fig. 2.— is a detail view showing the land-wheel and fourth wheel and the mounting of the same.

1 is a horizontal shaft disposed transversely across the implement in suitable bearings 2, the usual land-lever 3 being provided for the purpose of turning the said shaft.

Upon one end of the shaft 1 is a crank 4 which extends in a rearwardly direction and near the outer extremity of which is revolubly mounted by means of an axle 5 the land-wheel 6.

Upon the other end of the shaft 1 is provided a crank 7 which projects in a forwardly direction and upon which is carried by means of an axle 8 a fourth or furrow wheel 9. In order to permit of adjustment of the position of the wheel 9 upon the crank 7, the axle 8 is carried upon a member or buckle 10 slidably mounted upon such crank and adapted to be locked in any desired position by means of a set-screw 11, or other equivalent means, By the construction above described the implement may be placed in an inoperative condition for transport over roads or the like, by placing the land-lever in such a position that both the wheels 6 and 9 will be upon the same level and will therefore serve to carry the implement with the moldboards clear of the ground. When the implement is required for use, however, the lever is so operated as to raise the land wheel 6 to the required height which action causes the wheel 9 to be simultaneously lowered in which position it travels upon the ground between the furrows.

It will be understood therefore that by the present invention the plow will be at all times supported and prevented from overturning by means of the wheels 6 and 9.

In order to permit of the wheel 9 being adjusted to the required distance from the mold-board to travel between the furrows as above mentioned, the shaft 1 may be adapted to slide through the bearings 2 and to be locked in the required position, when the adjustment has been made, by means of collars or the like means clamped upon such shaft and adapted to bear against the ends of such bearings.

I claim:—

1. In a plow, a frame, a colter, a plow share coöperating with the colter, a shaft extending transversely of said frame and having its opposite ends extending on opposite sides of the share, an arm extending downwardly from one end of the shaft in a rearwardly and downwardly inclined direction with respect to the frame, a wheel secured to the free end of said arm, a second arm of substantially a right angle formation having one end secured to the opposite end of said shaft on the moldboard-side of plow and the other end thereof extending in a forward direction and in a horizontal plane, a substantially vertical stud axle, a clamping member for securing said axle to the horizontal end of said second arm and permitting a vertical and lateral adjustment of said axle on said end and relatively thereto, means for longitudinally adjusting said shaft, and means for oscillating said shaft.

2. In combination with a plow, a rockable shaft disposed transversely of the plow and provided with a crank at each end, the cranks being disposed in different planes, a wheel on one crank, a wheel adjustably carried by the other crank, means for rocking the shaft and means for locking the same in a desired position.

3. In combination with a plow, a rockable shaft disposed transversely of the plow and provided with a crank at each end, one of the cranks being disposed downwardly and rearwardly, and the other crank being disposed downwardly and provided with an extension, a wheel on the rearwardly extending crank, a wheel adjustably carried on the extension of the second crank, means for rocking the shaft, and means for locking the same in a desired position.

4. In combination with a plow, a rockable shaft disposed transversely of the plow and provided with a crank at each end, the cranks being disposed in different planes, locking means permitting the adjustment of the shaft transversely of the plow, a wheel on one of the cranks, a wheel adjustably carried by the other crank, and means for rocking the shaft and locking the same in a desired position.

In testimony whereof I have signed my name to this specification in the presence of two subscribing witnesses.

FRANCIS PATRICK DOWD.

Witnesses:
PERCY RICHMOND CLIMIE,
CYRIL CARLYN COABET.

Copies of this patent may be obtained for five cents each, by addressing the "Commissioner of Patents, Washington, D. C."